United States Patent [19]

Meyer et al.

[11] Patent Number: 5,477,907
[45] Date of Patent: Dec. 26, 1995

[54] PROCESS AND APPARATUS FOR DELIVERING A METERED SHOT

[75] Inventors: Henry Meyer, Etobicoke; Jason I. Aplin, Cambridge, both of Canada

[73] Assignee: Gasmac Inc., Guelph, Canada

[21] Appl. No.: 164,859

[22] Filed: Dec. 10, 1993

[30] Foreign Application Priority Data

Jan. 7, 1993 [CA] Canada ................................ 2086879

[51] Int. Cl.⁶ .................................................. B22D 39/06
[52] U.S. Cl. ...................... 164/133; 164/155.4; 164/457; 222/595; 266/239
[58] Field of Search ................................. 164/133, 457, 164/4.1, 151.3, 155.4, 154.2; 222/595; 266/94, 95, 239

[56] References Cited

U.S. PATENT DOCUMENTS

| | | | |
|---|---|---|---|
| 1,092,938 | 4/1914 | Mellen. | |
| 2,161,181 | 6/1939 | Marx | 266/9 |
| 2,436,124 | 2/1948 | Sklenar | 75/43 |
| 2,846,740 | 8/1958 | Edstrand. | |
| 2,937,789 | 5/1960 | Tama | 266/239 X |
| 2,991,060 | 7/1961 | Sklenar | 263/11 |
| 3,050,794 | 8/1962 | Holz | 266/239 X |
| 3,191,247 | 6/1965 | Holz | 266/239 X |
| 3,395,833 | 8/1968 | Rice, Jr. | 222/585 |
| 3,412,899 | 11/1968 | Sutter | 164/155.4 X |
| 3,504,825 | 4/1970 | Diamond et al. | 222/595 |
| 3,675,911 | 7/1972 | Kapun | 266/239 X |
| 4,220,319 | 9/1980 | Rohmann | 266/89 |
| 4,687,438 | 8/1987 | Schmidt et al. | 432/57 |
| 5,031,805 | 7/1991 | Rohmann | 222/590 |

FOREIGN PATENT DOCUMENTS

| | | | |
|---|---|---|---|
| 1280593 | 2/1991 | Canada. | |
| 1558279 | 11/1969 | Germany | 222/595 |
| 2022989 | 12/1971 | Germany | 222/595 |
| 63-60066 | 3/1988 | Japan | 164/155.4 |
| 691241 | 10/1979 | U.S.S.R. | 222/595 |

Primary Examiner—J. Reed Batten, Jr.
Attorney, Agent, or Firm—Jeffrey Imai; Arne I. Fors; Horne, D. Doak

[57] ABSTRACT

An apparatus for delivering a metered shot of molten metal from a dispensing vessel through a shot tube comprises: a dispensing vessel for holding molten metal and having a shot tube for discharge of the molten metal, a reservoir of gas for pressurizing the dispensing vessel, a variable regulator for regulating the flow of gas. The regulator has a backload for varying the pressure at which the regulator regulates the flow of gas. An exhaust vent vents the dispensing vessel to the atmosphere. A supply valves opens and closes the delivery of gas to the holding vessel. A controller (i) maintains the exhaust valve closed, opens the backload and the supply valve pressurizing the holding vessel until the molten metal is at a predetermined level in the shot tube, (ii) closes the backload fixing the delivery pressure and maintains the delivery pressure within the holding vessel for a predetermined period of time discharging molten metal out the shot tube, (iii) closes the supply valve and opening the exhaust vent terminating the discharge of the molten metal.

12 Claims, 3 Drawing Sheets

1

PROCESS AND APPARATUS FOR DELIVERING A METERED SHOT

FIELD OF INVENTION

This invention relates to a process and apparatus for delivering a metered shot of molten metal.

BACKGROUND OF INVENTION

In casting of ferrous and non-ferrous products, metal is melted in a melting furnace. The molten metal is stored in a molten state ready for delivery to the mold. A metered amount of molten metal is delivered to the mold. Several devices have been proposed which will deliver a metered amount of molten metal or a shot to the mold.

An automatic ladling system is described in U.S. Pat. No. 2,846,740 and known as the LINDBERG AUTOLADLE™. The LINDBERG AUTOLADLE™ comprises a crucible communicating with a balance tube and a delivery tube. The balance tube communicates with the molten metal of the furnace and the crucible. The delivery tube communicates with the exterior and the crucible for delivery of the shot to the mold cavity. The crucible is initially unpressurized. The molten metal inside the crucible is level with the top of the balance tube. The top of the balance tube is slightly above the maximum level of molten metal within the furnace. Air pressure is forced into the crucible and forces the molten metal through the delivery tube into a launder. The amount of metal delivered is controlled by an adjustable timer. Once a predetermined time period has elapsed, a vacuum is applied to the crucible drawing molten metal from both the balance tube and the delivery tube. Molten metal is drawn into the crucible until its level is above the height of the balance tube. The crucible is then vented to the atmosphere allowing the metal to flow back into the furnace until the level of the molten metal in the crucible is the same as the height of the balance tube.

The LINDBERG AUTOLADLE™ will generally deliver adequate amounts of shot to the mold cavity. However in situations where high efficiency is required, the LINDBERG AUTOLADLE™ will not provide sufficient accuracy in the delivery of a shot on a consistent and long term basis.

Developments have been made in order to increase the accuracy of the quantity of shot delivered. One such device is described in U.S. Pat. No. 4,220,319. In this device, complicated sequences of varying pressures over predetermined time periods are used. The pressure sequences are designed to compensate for smaller amounts of metal being delivered due to the gradual sinking of the level of molten metal in the dosing chamber. However, such devices become complicated and accordingly become expensive to manufacture and difficult to operate.

SUMMARY OF INVENTION

The disadvantages of the prior art may be overcome by providing a relatively simple device and method for delivering a metered shot which is not dependent upon the level of molten metal within the furnace.

It is further desirable to provide an apparatus for delivering a metered shot of molten metal which operates by pressuring a dispensing vessel until the metal reaches the mouth of the shot delivery tube and then maintaining a constant pressure for a fixed period of time and then rapidly reducing the pressure to substantially atmospheric, terminating the shot.

According to one aspect of the invention, there is provided an apparatus for delivering a metered shot of molten metal from a dispensing vessel through a shot tube. The apparatus comprises:

a dispensing vessel for holding molten metal; the dispensing vessel is substantially airtight having a bottom, side walls and a top; the vessel has a shot tube for discharging the molten metal; the shot tube extends from the bottom of the dispensing vessel upwardly above the molten metal to an upper end and communicates with a delivery tube for delivering the molten metal to a mold;

pressure means for causing a flow of gas under pressure from a reservoir to the dispensing vessel;

a variable regulator for regulating the pressure of the flow of gas; the regulator has a first chamber and a second chamber separated by a diaphragm; the diaphragm is operably connected between a biasing means and a valve means for regulating pressure of the flow; the second chamber is adapted to be pressurized by a flow downstream of the regulator;

a backload means for pressurizing the first chamber of the regulator means and connected between the holding vessel and the first chamber and having a backload valve means for opening and closing the backload means;

an exhaust vent adapted to vent the dispensing vessel to the atmosphere and having an exhaust valve means for opening and closing the exhaust vent, a supply valve means for opening and closing the delivery of gas to the holding vessel, a probe mounted at the upper end of the shot tube for detecting the level of molten metal and generating a signal, and controller means for (i) maintaining the exhaust valve closed, opening the backload means and the supply valve means pressurizing the holding vessel until the controller means receives the signal, (ii) closing the backload means, and maintaining the pressure within the holding vessel for a predetermined period of time discharging molten metal out the shot tube, (iii) closing the supply valve and opening the exhaust vent terminating the discharge of the molten metal.

According to one aspect of the invention, there is provided a method for delivering a metered shot of molten metal from a dispensing vessel to a mold through a shot tube, the steps comprising:

applying gas to the dispensing vessel until the level of the molten metal is at a predetermined level in the shot tube defining a delivery pressure within the dispensing vessel;

applying gas at the delivery pressure to the dispensing vessel for a predetermined time period forcing a metered shot of molten metal out the shot tube, and venting the dispensing vessel to rapidly reduce the pressure within the dispensing vessel to substantially atmospheric terminating the delivery of the shot.

BRIEF DESCRIPTION OF THE DRAWINGS

In drawings which illustrate embodiments of the invention.

DETAILED DESCRIPTION OF THE INVENTION

Figure 1:
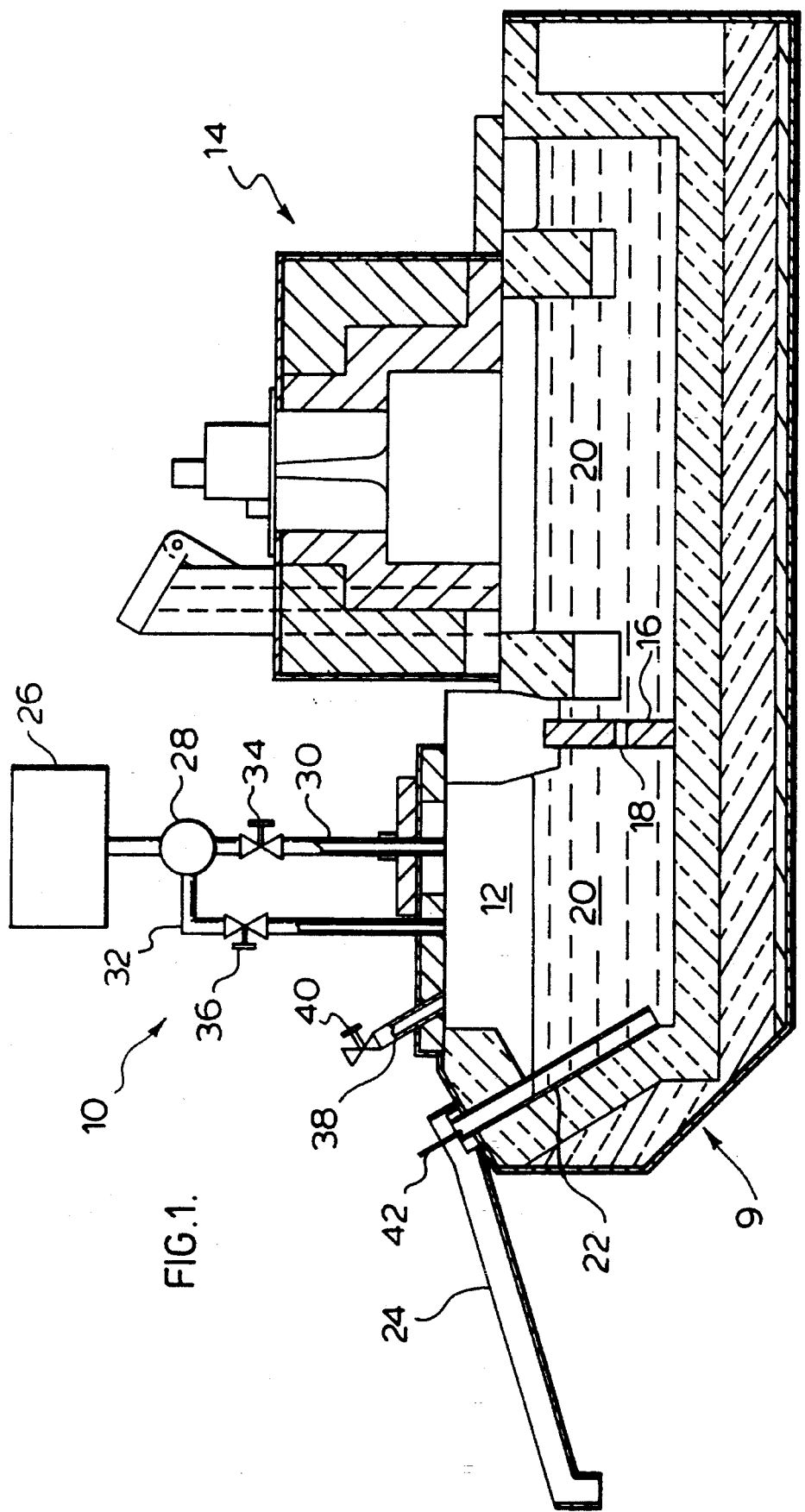
FIG. 1 is a sectional view of a dosing furnace showing the dosing device of the present invention.
Figure 2:
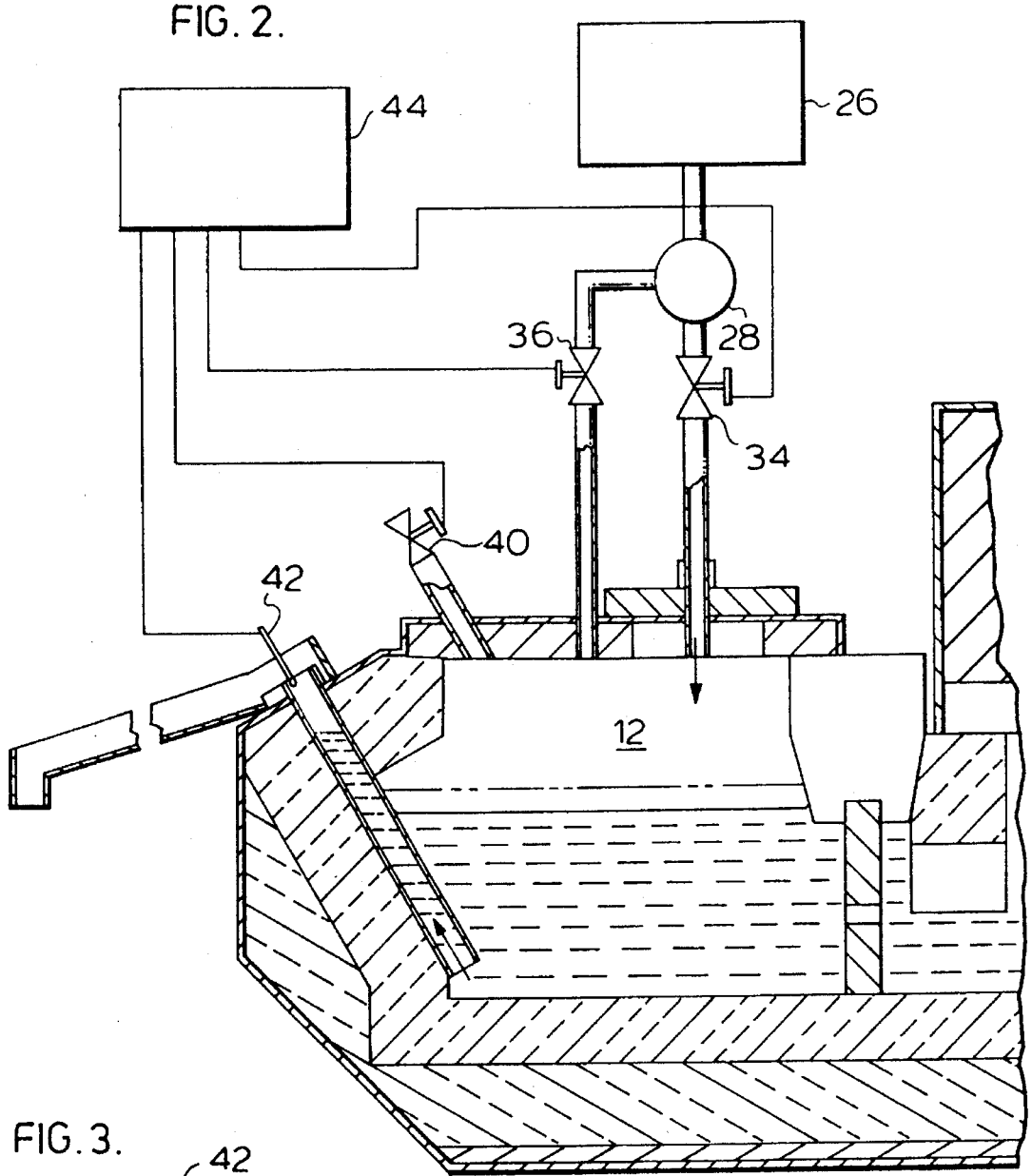
FIG. 2 is a sectional view of the dispensing vessel of the furnace in FIG. 1 showing the mechanical arrangement of the invention.

The dosing device 10 of the present invention is generally illustrated in FIG. 1. The dosing device 10 is mounted on a dispensing vessel 9 defining a pressurizing chamber 12. Dispensing vessel 9 is mounted adjacent a holding or melting furnace 14. A wall 16 separates the molten metal of the furnace 14 from the dispensing vessel 9. A port 18 allows molten metal 20 to flow freely between the dispensing vessel 9 and the furnace 14.

A shot tube 22 is mounted in the dispensing vessel 9. At the upper end of the shot tube, a delivery tube 24 extends from the shot tube 22 to the mold.

A supply of compressed gas in reservoir 26 is connected to a regulator 28 which is connected to the pressurizing chamber 12 via pipe 30. A backload pipe 32 is connected to the pressurizing chamber 12 to the supply side of the regulator 28 backloading the regulator 28. Pipe 30 has solenoid valve 34 to control the flow of gas therethrough. Pipe 32 has solenoid valve 36 to control the flow of gas therethrough.

An exhaust pipe 38 having solenoid valve 40 is connected to the pressurizing chamber 12 for venting the pressurizing chamber 12 to the atmosphere.

Figure 3:
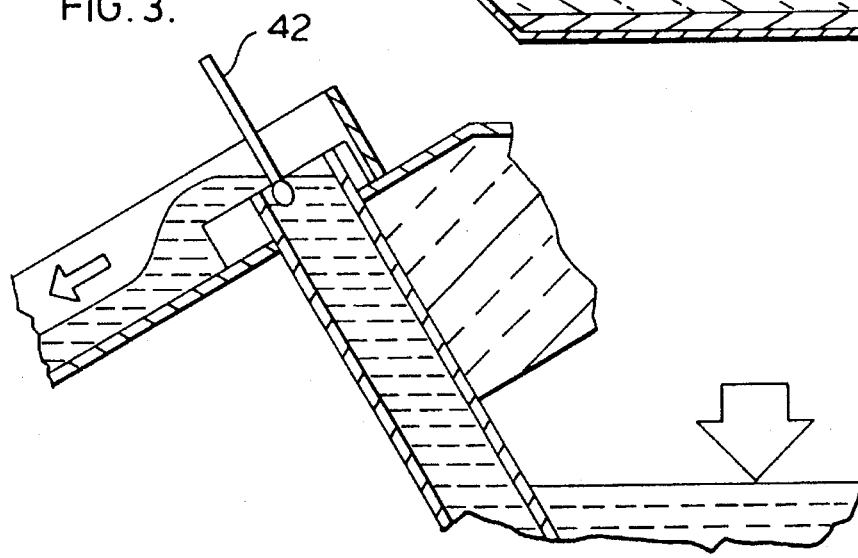
FIG. 3 is a sectional view of the shot and delivery tubes of the invention according to FIG. 1 showing the metal sensing electrode.

Referring to FIG. 3, a probe 42 is mounted at the mouth of the shot tube 22 to indicate when the level of the molten metal 20 has risen to the mouth of the shot tube 22. Probe 42 will generate a signal which is sent to the control 44.

Figure 4:
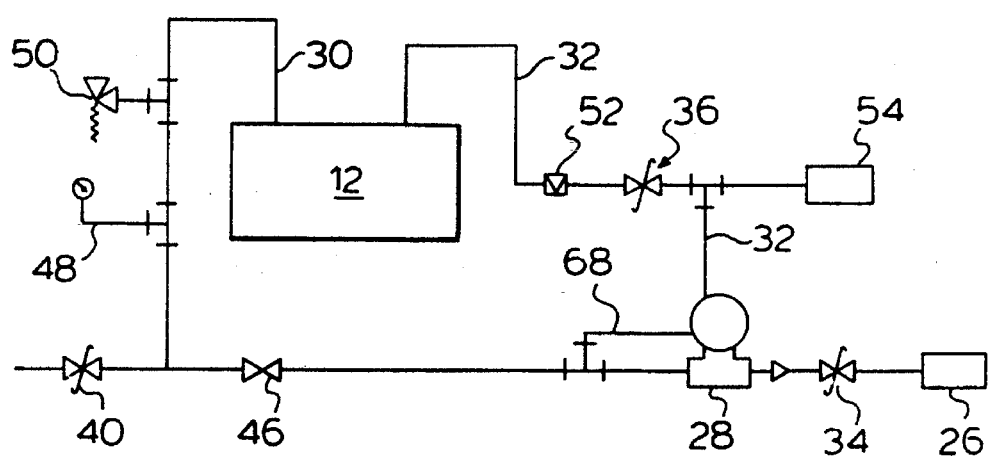
FIG. 4 is a schematic diagram of the control system of the invention of FIG. 1.

Referring to FIG. 4, the flow circuit is illustrated. In FIG. 4, solenoid valve 34 is illustrated as being upstream of the regulator 28 and the exhaust solenoid valve 40 in line with the regulator. Either arrangement will produce similar results. Additionally, the flow diagram illustrates a butterfly valve 46 in line with the regulator 28 to control the flow therethrough. A pressure gauge 48 may be installed to monitor the pressure of the gas being delivered to the pneumatic chamber 12. A relief valve 50 may be installed as a safety measure.

In line with the backload pipe 32 is a limiting orifice to limit the flow therethrough to stabilize the operation of the system. A backload reservoir 54 is provided to supply gas to the system.

Figure 5:
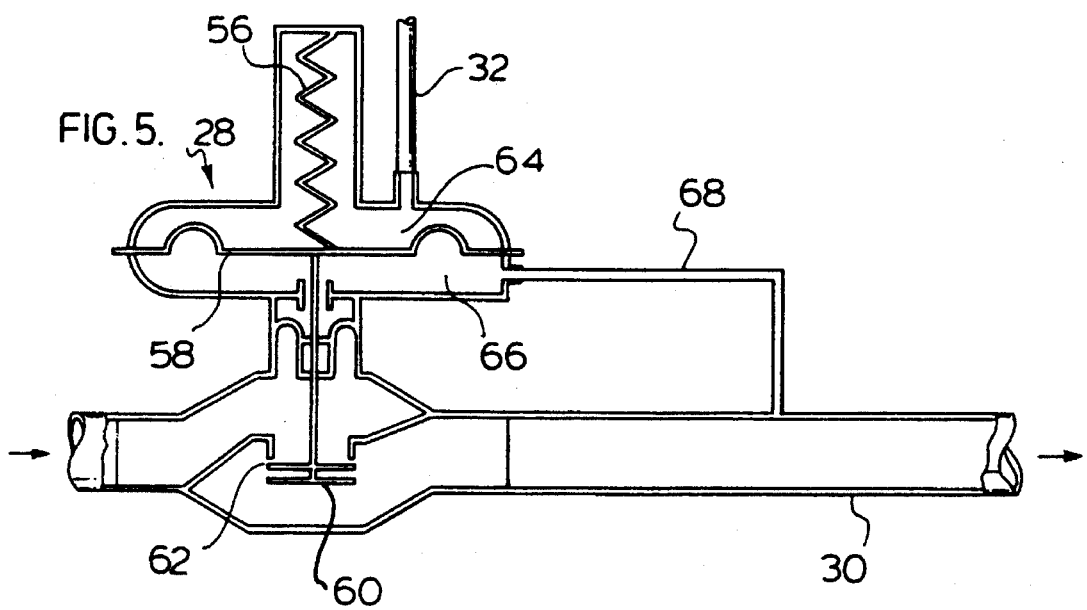
FIG. 5 is a sectional view of the back-loaded regulator of the invention of FIG. 1.

Referring to FIG. 5, the regulator 28 is illustrated in detail. The regulator which can be used in the present invention must be designed to be backloaded. In the present invention a ROCKWELL™ Series 121 regulator is used and illustrated in FIG. 5. The ROCKWELL™ Series 121 regulator requires the regulator to be installed in a horizontally extending pipe. The manufacturers' instructions should be referred to prior to installing other regulators. Regulator 28 maintains an outlet pressure at any flow despite the inlet fluctuations.

Regulator 28 comprises a spring 56 connected between a housing and a diaphragm 58. Diaphragm 58 is operable connected to a valve 60 which opens and closes orifice 62 to regulate gas flow through the regulator as indicated by the flow arrows. Diaphragm 58 separates the housing into an upper chamber 64 and a lower chamber 66. Upper chamber is connected to backload pipe 32 and will be pressurized to the pressure therein. Lower chamber 66 is connected to control line 68 and will be pressurized to the pressure downstream of the regulator 28.

Figure 6:
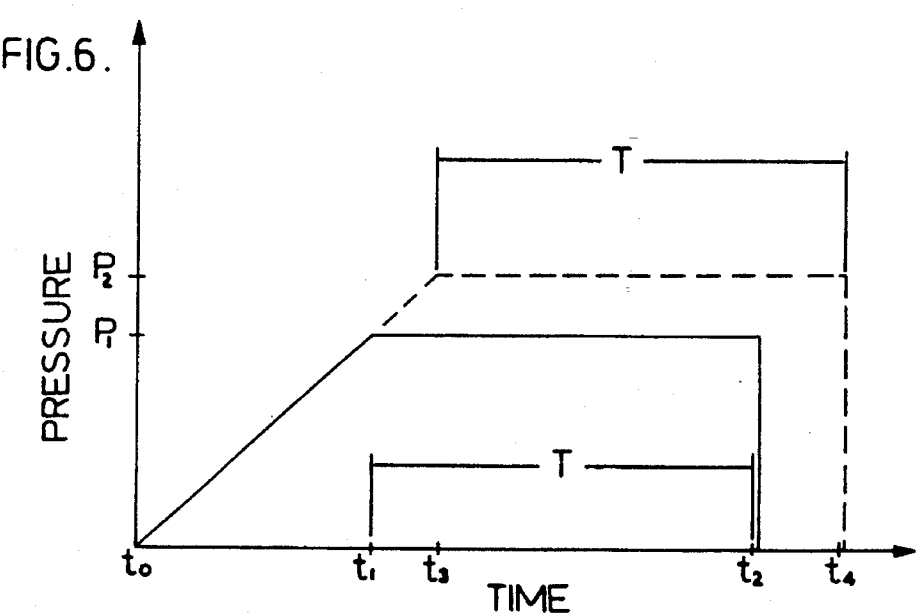
FIG. 6 is a graph illustrating the pressure-time relationship of the invention of FIG. 1.

The operation of the invention will be described with reference to FIG. 6. Reservoir 26 will have a supply of compressed gas. Normally the gas will be compressed air. However, any compressed gas may be used, including inert gasses to reduce or prevent the molten metal from being oxidized. Reservoir 26 can have a pressure of between 5 to 100 psi.

At the beginning of each cycle at time $t_0$, exhaust solenoid 40 will be closed and controller 44 will open solenoid valves 34 and 36. Gas will flow through the regulator 28 and pressurize the pressurizing chamber 12. The pressure in the pressurizing chamber 12 will be translated through backload pipe 32 into the upper chamber 66 of the regulator 28. The additional pressure in the chamber will cause the valve 60 to remain open allowing more gas to flow allowing the pressure to build up in pressurizing chamber 12.

As the pressure in pressurizing chamber 12 continues to increase, the force acting on the molten metal increases causing the metal to move downwardly and upwardly through the shot tube. The process continues until $t_1$ when the leading edge of molten metal contacts probe 40 mounted in the mouth of the shot tube. At $t_1$, the probe 40 will generate a signal and send it to controller 44. Controller 44, upon receiving the signal, will shut off solenoid 36 fixing the pressure $p_1$ in the upper chamber 64. From this point on, the regulator will regulate the pressure in the supply line at a constant delivery pressure $p_1$.

The controller 44 will allow the flow of gas to continue for a predetermined period of time T allowing a metered amount of molten meal to be forced out of the dispensing vessel and out the shot tube. At time $t_2$, solenoid 34 is turned off terminating the supply of compressed gas and solenoid 40 is opened venting the gas to the atmosphere reducing the pressure within pressurizing chamber 12 to substantially atmospheric terminating the flow of metal out the shot tube.

In the next cycle, the level of the molten metal has been reduced. Accordingly, it takes longer to push the molten metal up the shot tube to the mouth of the shot tube resulting in higher pressure in the pressurizing chamber 12. Due to the backloading of regulator 28, the regulator 28 will allow the pressure to build up to $p_2$ before the signal is sent to the controller 44. The same time period T, i.e. $t_4$–$t_3$, is used to push a metered shot out the shot tube.

The amount of shot is determined by the magnitude of time period T used. The rate of delivery is controlled by butterfly valve 46 and orifice valve 52. These valve can be operated manually or remotely. Reservoir 54 will collect excess gasses for reuse. Additionally, reservoir 54 can serve to supply additional backloading pressure when necessary.

The preferred embodiment illustrates the dispensing vessel 9 having a port for allowing the passage of molten metal from the furnace chamber to the dispensing vessel 9. As the pressure builds in the pressurizing chamber, some molten metal will be forced out the port back into the furnace chamber. The amount forced back into the furnace chamber can be calculated as a function of the ratio between the cross-sectional area of the shot tube and the port.

The preferred embodiment has been described in terms of a dispensing vessel 9 separated from a holding or melting furnace. It is apparent that the invention could be used on any arrangement of furnace and provide satisfactory results.

It will be obvious to those skilled in the art that various modifications and changes can be made to the system without departing from the spirit and scope of this invention.

I claim:

1. A process for delivering a metered shot of molten metal through a shot tube of a substantially airtight dispensing vessel, said shot tube extending upwardly from a bottom of said vessel, the process comprising steps of:

applying gas through a variable regulator to the dispensing vessel to build up pressures within said dispensing vessel forcing molten metal to flow through said shot tube until the molten metal is at a predetermined level in the shot tube;

responsive to said molten metal being at said predetermined level, fixing said variable regulator to apply gas to the dispensing vessel at a constant delivery pressure for a predetermined time period forcing a metered shot of molten metal out the shot tube, and venting the dispensing vessel to rapidly reduce the pressure within the dispensing vessel to substantially atmospheric terminating flow of said molten metal.

2. An apparatus for delivering a metered shot of molten metal through a shot tube of a substantially airtight dispensing vessel, said shot tube extending upwardly from a bottom of said vessel, the apparatus comprising:

a variable regulator for passing a flow of gas under pressure to said dispensing vessel to build up gas pressures within said dispensing vessel for forcing molten metal to flow through said shot tube;

a supply valve for controlling said flow of gas;

a backload means for communicating gas pressure in the dispensing vessel to said variable regulator, said backload means having a backload vane for opening and closing said backload means;

said variable regulator comprises
an inlet and an outlet for passing said flow of gas therethrough, a control line for sensing the pressure of the flow of gas at a point downstream of said variable regulator and before said dispensing vessel, and a regulator valve operatively mounted between said inlet and outlet for regulating pressure at which said flow of gas passes therethrough, said regulator valve opens and closes responsively to differences in gas pressures in said backload means and said control line;

a sensor positioned for detecting molten metal at a predetermined level in said shot tube and responsively generating a signal, an exhaust vent for venting the dispensing vessel to an atmospheric pressure and having an exhaust valve for opening and closing the exhaust vent;

a controller operably connected to said supply valve, backload vane, exhaust valve and sensor, whereby said controller (i) with the exhaust vane closed, opens the backload vane and the supply valve for pressurizing the dispensing vessel, (ii) responsive to said signal, closes the backload vane fixing gas pressure in said backload means causing said variable regulator to become fixed to pass said flow of gas to the dispensing vessel at a constant delivery pressure, (iii) waits a predetermined period of time allowing the flow of gas to continue at said delivery pressure discharging a metered amount of molten metal out the shot tube, (iv) closes the supply valve and opens the exhaust vane reducing gas pressure within said dispensing vessel for terminating discharge of the molten metal.

3. An apparatus as claimed in claim 2 wherein said regulator has a first chamber and a second chamber separated by a diaphragm, said diaphragm operably connected to a biasing means and said regulator vane, said backload means pressurizes the first chamber and said control line pressurizes said second chamber.

4. An apparatus as claimed in claim 2 wherein said shot tube communicates with a delivery tube for delivering the molten metal to a mold.

5. An apparatus as claimed in claim 4 wherein said sensor is a probe mounted at an upper end of said shot tube.

6. An apparatus as claimed in claim 5 wherein said dispensing vessel communicates with a melting furnace for supplying molten metal to said dispensing vessel.

7. An apparatus as claimed in claim 6 wherein said dispensing vessel is adjacent said melting furnace.

8. An apparatus as claimed in claim 6 wherein said dispensing vessel is integral with said melting furnace.

9. An apparatus for delivering a metered shot of molten metal, comprising:

a dispensing vessel for holding molten metal, said dispensing vessel is substantially airtight having a bottom, side walls and a top, said vessel having a shot tube for discharging the molten metal, said shot tube extends from the bottom of the dispensing vessel upwardly above the molten metal to an upper end which communicates with a delivery tube for delivering the molten metal to a mold, pressure means for effecting a flow of gas under pressure, a variable regulator for passing the flow of gas from said pressure means to said dispensing vessel to build up pressures within said dispensing vessel for forcing molten metal to flow through said shot tube, said variable regulator comprises an inlet and an outlet for passing said flow of gas therethrough, a first chamber and a second chamber separated by a diaphragm, said diaphragm connected to a biasing means and a regulator valve, said regulator valve operatively mounted between said inlet and outlet for regulating pressure at which said flow of gas passes therethrough, and a control line connected to said second chamber for sensing the pressure of the flow of gas at a point downstream of said variable regulator and before said dispensing vessel;

a backload means for pressurizing the first chamber, said backload means connected between the dispensing vessel and the first chamber and having a backload valve for opening and closing the backload means, said regulator valve opens and closes responsively to differences in gas pressures in said backload means and said control line;

an exhaust vent for venting the dispensing vessel to an atmospheric pressure and having an exhaust valve for opening and closing the exhaust vent, a supply valve for controlling the flow of gas to the dispensing vessel, a probe mounted for detecting molten metal at the upper end of said shot tube and responsively generating a signal, and a controller operably connected to said supply valve, backload valve, exhaust valve and sensor, whereby said controller (i) closes the exhaust valve and opens the backload valve and the supply valve for pressurizing the dispensing vessel urging the molten metal through the shot tube, (ii) responsive to said signal, closes the backload valve establishing a delivery pressure at which said variable regulator passes said flow of gas to the dispensing vessel, (iii) waits a predetermined period of time allowing the flow of gas to continue at said delivery pressure discharging a metered amount of molten metal out the shot tube, (iv) closes the supply valve and opens the exhaust valve reducing gas pressure within said dispensing vessel for terminating discharge of the molten metal.

10. An apparatus as claimed in claim 9 wherein said dispensing vessel communicates with a melting furnace for supplying molten metal to said dispensing vessel.

11. An apparatus as claimed in claim 10 wherein said dispensing vessel is adjacent said melting furnace.

12. An apparatus as claimed in claim 10 wherein said dispensing vessel is integral with said melting furnace.

* * * * *